June 22, 1954 T. C. LITTLEFIELD 2,681,639
AUTOMATIC POULTRY FEEDER
Filed May 29, 1950 3 Sheets-Sheet 2
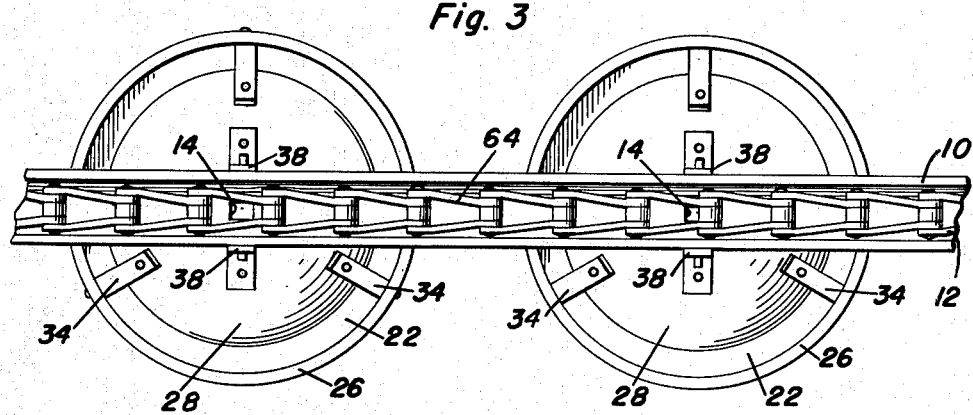
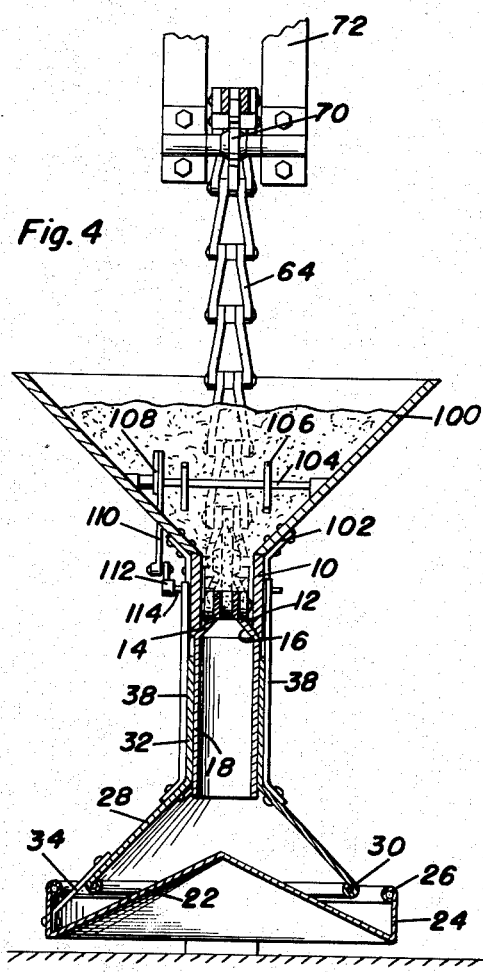
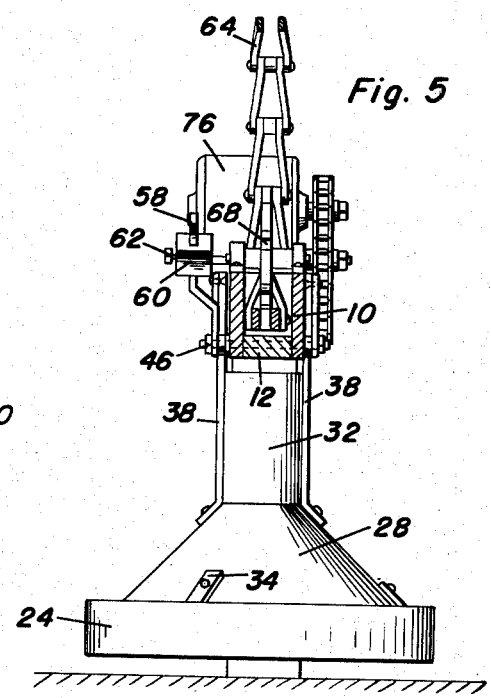
Thurland C. Littlefield
INVENTOR.

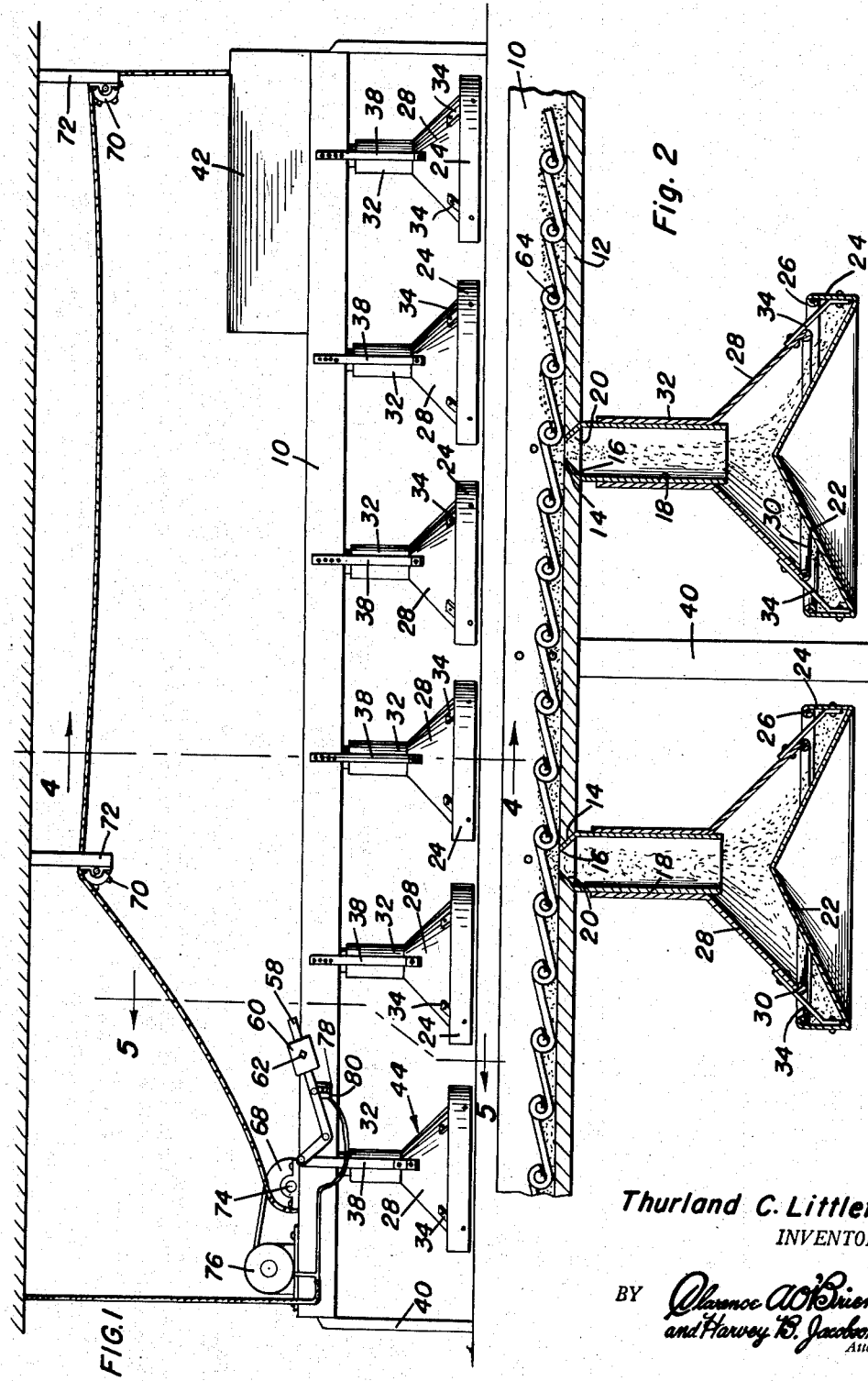

June 22, 1954
T. C. LITTLEFIELD
2,681,639
AUTOMATIC POULTRY FEEDER
Filed May 29, 1950
3 Sheets-Sheet 3
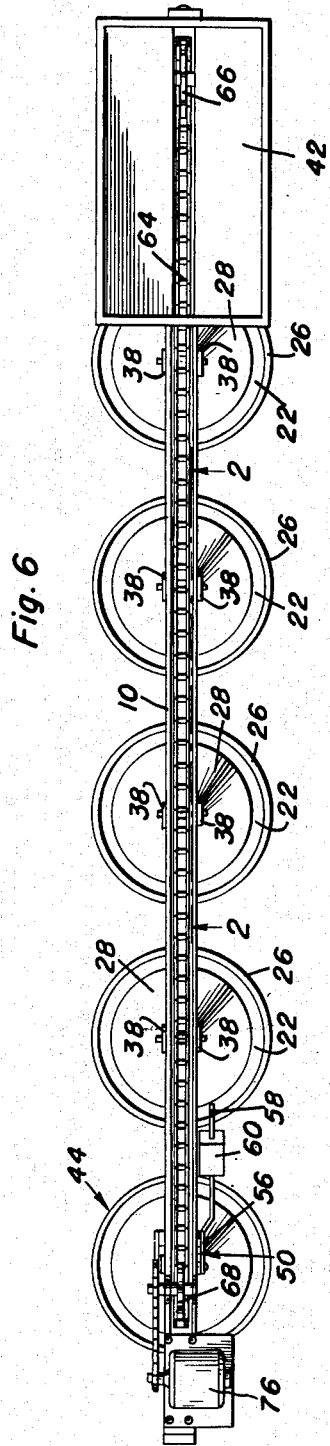
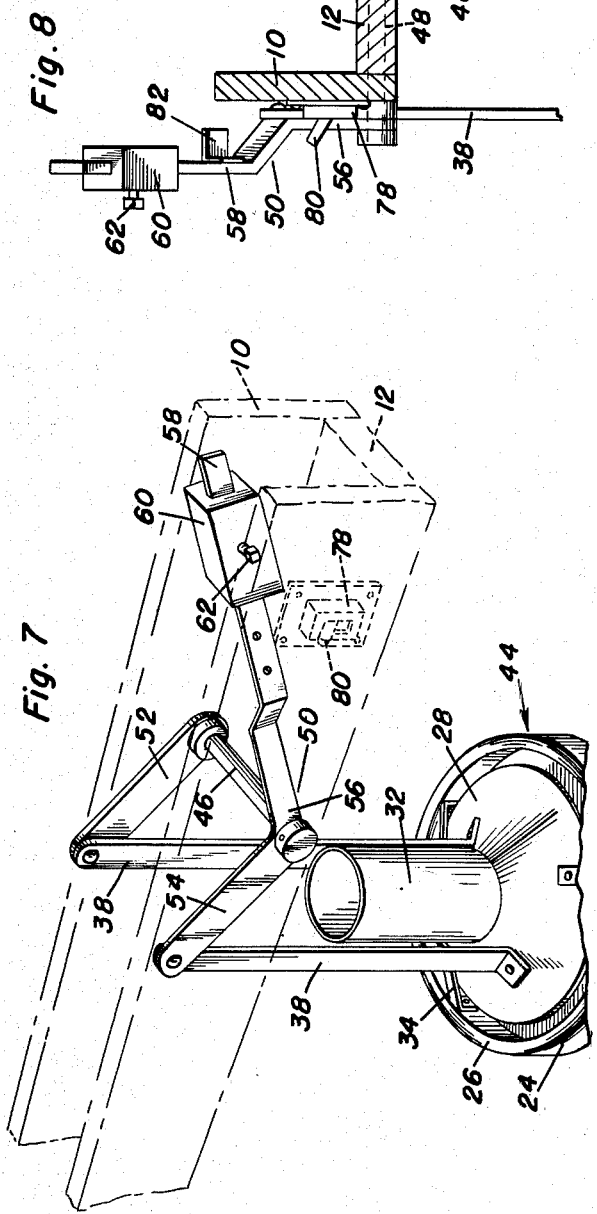
Thurland C. Littlefield
INVENTOR.

Patented June 22, 1954

2,681,639

UNITED STATES PATENT OFFICE 2,681,639

AUTOMATIC POULTRY FEEDER

Thurland C. Littlefield, Pittsfield, Maine

Application May 29, 1950, Serial No. 164,964

6 Claims. (Cl. 119—57).

This invention relates to new and useful improvements in poultry feeders and the primary object of the present invention is to provide a poultry feeder involving a conveyor means and a vertically movable receptacle for receiving feed from the conveyor and which will actuate the conveyor means to supply feed to the receptacle whenever the feed in the receptacle is diminished a predetermined amount.

Another very important object of the present invention is to provide a poultry feeder including a gang of receptacles, a conveyor operated by an electric motor having a switch that will be actuated after a predetermined amount of feed has entered the end receptacle of the gang to open the circuit to the motor.

Yet another object of the present invention is to provide a poultry feeder that is automatically actuated to supply feed from a hopper into one or more feed holding receptacles.

Another object of the present invention is to provide a feeder including a conveyor actuated agitating means that will prevent feed from clogging up in the hopper of the feeder.

A further object of the present invention is to provide a poultry feeder including a novel and improved receptacle structure that is so constructed as to permit poultry to feed therefrom in a safe manner without the poultry contacting any sharp or harmful edges and/or projections.

A still further aim of the present invention is to provide a poultry feeder of tested ability that is simple and practical in construction, strong and reliable in use, small and compact in structure, inexpensive to manufacture, and which embodies a group of individually removable receptacles that may be cleaned, repaired and replaced in a convenient manner.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the present poultry feeder;

Figure 2 is an enlarged longitudinal vertical sectional view taken substantially on the plane of section line 2—2 of Figure 6;

Figure 3 is an enlarged fragmentary top plan view of Figure 1;

Figure 4 is an enlarged transverse vertical sectional view taken substantially on the plane of section line 4—4 of Figure 1 and showing a hopper including an agitator applied to one of the receptacles;

Figure 5 is an enlarged vertical sectional view taken substantially on the plane of section line 5—5 of Figure 1;

Figure 6 is a plan view of Figure 1;

Figure 7 is a perspective view showing one of the receptacles and the balancing means located relatively close to the motor switch (dotted lines); and Figure 8 is an enlarged detail sectional view showing the balancing means and the switch operator raised above the motor switch.

Referring now to the drawings in detail, wherein for the purpose of illustration, there is disclosed a preferred embodiment of the present invention, the numeral 10 represents an elongated substantially channel shaped trough whose web portion 12 is provided with a plurality of longitudinally spaced dispensing openings 14. The openings 14 are upwardly tapered and receive the reduced upper end portions 16 of vertically disposed dispensing tubes or conduits 18. The end portions 16 are secured to the edges defining the openings 14 by fasteners or the like 20.

The apices or minor ends of conical pans 22 underlie the tubes 18 and flanges 24 rise from and surround the major ends of the pans 22. The upper edges of the flanges 24 are rolled to provide beads or smoothly curved sleeves 26 that will in no way harmfully effect poultry feeding from the pans.

Hollow conical shields 28 overlie the pans 22 and receive the minor ends of the pans. The lower edges of the shields 28 are rolled inwardly upon themselves to provide beads or internal sleeves 30 that are spaced above the periphery of the pans 22 sufficiently to permit feed on the pans and against the flanges 24 to be exposed to poultry. The upper minor ends of the shields are integrally formed with or attached to sleeve members 32 that slidably embrace the tubes 18. A plurality of circumferentially spaced hanger straps 34 are terminally attached to the shields 28 and the flanges 24 to join and support the pans relative to the shields.

A pair of longitudinally extending hanger arms 38 are secured to and rise from each of the sleeve members 32 and are pivotally and adjustably secured to the side walls of the trough and constitute the sole means for attaching the receptacles (32, 28, 22, 24, 34) to the trough.

The trough 10 is supported in a substantially horizontal position by any suitable number of legs 40 and a hopper 42 is mounted on the trough at one end of the trough. The receptacle 44 remote from the hopper 42 is secured to the trough 10 slightly different than the other receptacles and the manner in which the receptacle 44 is secured to the trough is illustrated best in Figure 7 and comprises a horizontal pivot 46 that extends through a transverse opening 48 in the web portion.

The pivot 46 extends through the apex of a bell-crank lever 50 and one end of a connecting link 52. The lever 50 and the link 52 are located on opposite sides of the trough. The free end of the link 52 is pivoted to one of the hanger arms 38 of the receptacle 44 and one leg portion 54 of the bell-crank lever 50 is pivoted to the other hanger arm 38 of the receptacle 44. The other leg portion 56 of the lever 50 is provided with a longitudinally extending offset 58 that slidably supports a weight 60 having a set screw 62 that is adjustable to bear against the offset 58.

The weight 60 will urge the leg portion 54 and the receptacle 44 to their raised position until a predetermined amount of feed has entered the receptacle, whereupon the weight of the receptacle and the feed therein will overcome the action of the weight and the receptacle will move to its lowered position.

The lower flight of an endless chain belt or conveyor 64 is trained through the trough 10 and the hopper 42 and about a sprocket 66 in the hopper 42 and another sprocket 68 at the end of the trough remote from the hopper. The conveyor 64 is also trained over any suitable number of upper sprockets 70 that are mounted on ceiling brackets 72.

The supporting shaft 74 for the sprocket 68 is operatively connected to the drive shaft of an electric motor 76 and the circuit to the motor includes a conventional switch 78 having a rock button 80. The switch 78 is mounted on the trough and is adapted to be actuated by a flexible angle member or switch operator 82 secured to the inner face of the offset 58.

In practical use of the present invention, as the motor 76 is started, the conveyor 64 is driven to carry feed from the hopper through the trough 10. As feed is moved through the trough 10 the feed will pass into the receptacles, the last receptacle being filled will be the receptacle 44. When the receptacle 44 is filled it will move downwardly to raise the leg portion 56 and the operator 82 will ride against the switch button 80 and urge the switch to its circuit open position to stop the motor 76.

When a predetermined amount of feed is removed from the receptacle 44, the weight 60 will raise the receptacle 44 and as the leg portion 56 is lowered, the operator 82 rides against the button 80 to actuate the switch and close the circuit to the motor whereupon the conveyor will again travel.

Figure 4 shows a hopper 100 associated with one end of the trough 10 in the form of a funnel whose reduced end is secured to the end of the trough remote from the power means by brackets 102. A horizontal shaft 104 is mounted in the hopper 100 for rotation and supports a plurality of radially disposed agitating fingers 106.

A laterally projecting finger 108 is mounted on the shaft 104 and is pivoted to a link 110 that extends through a slot in the hopper wall. The link 110 is pivoted to a crank arm 112 that is mounted on a shaft 114 and the latter is operatively connected to and rotated by the chain 64.

Having described the invention, what is claimed as new is:

1. In a poultry feeding device including a conveyor, a trough in which the conveyor is movable and an electrically operated power means for operating the conveyor and including a switch, a vertical dispensing tube extending downwardly from the trough, a vertically movable receptacle for receiving feed from said conveyor and including a sleeve portion vertically slidable on the tube, means urging said receptacle to its raised position relative to the trough, until a predetermined amount of feed has entered the latter, and means carried by said urging means for selectively actuating said switch to its open and closed positions upon lowering and raising of said receptacle relative to the trough.

2. In a poultry feeding device including a conveyor, a trough receiving the conveyor and having a dispensing opening, and an electrically operated power means for operating the conveyor and including a switch, a dispensing tube extending vertically downward from the opening, a receptacle mounted on said tube for vertical movement, a vertically swinging arm attached to said receptacle, a weight mounted on said arm and urging the receptacle raised relative to the tube until a predetermined amount of feed has entered the receptacle, and a switch operator on said arm for selectively forcing the switch to its open and closed positions upon lowering and raising of said receptacle relative to the trough.

3. In a poultry feeding device including a conveyor, a trough receiving the conveyor and having a dispensing opening, and an electrically operated power means for operating the conveyor and including a switch, a vertical dispensing tube extending downwardly from the opening, a receptacle having a sleeve portion slidable vertically on said trough, a horizontal pivot on said trough, means connecting said pivot to said receptacle and including a vertically swingable bell crank lever having first and second leg portions, a weight adjustably mounted on the second leg portion of said lever for urging the first leg portion of said lever and said receptacle to a raised position until a predetermined amount of feed has entered the receptacle, and a switch operator on the second leg portion of said lever for selectively actuating said switch to its open and closed positions upon lowering and raising of said receptacle.

4. In a poultry feeding device including a conveyor, a trough receiving the conveyor and having a dispensing opening, and an electrically operated power means for operating the conveyor and including a switch, a vertical dispensing tube extending downwardly from the opening, a receptacle having a sleeve portion vertically slidably mounted on said trough for raising and lowering movement relative to said trough, a horizontal pivot on said trough, means connecting said pivot to said receptacle and including a vertically swingable bell crank lever having first and second leg portions, a means acting on the second leg portion of said lever and urging the first leg portion of said lever and said receptacle to a raised position, and a finger projecting laterally from said second leg portion for actuating the switch to its circuit open position during lowering of the receptacle relative to said trough and for actuating the switch to its circuit closed position during raising of the receptacle relative to the trough.

5. The combination of claim 4 wherein said finger is flexible to permit the finger to ride completely past the switch.

6. In a poultry feeder including an elongated trough having a plurality of longitudinally spaced dispensing openings therein, a conveyor received in the trough, and an electrically operated power means for moving the conveyor and including a switch, a plurality of vertically disposed dispensing tubes extending downwardly from the openings, a plurality of receptacles mounted on and hanging from said trough and having vertical sleeve portions slidable vertically on the tubes, a hopper at one end of said trough through which the conveyor is movable to conduct feed from the hopper to the trough, one of said receptacles being located remotely from said hopper, means operatively connected to said one of said receptacles and urging said one of said receptacles to a raised position relative to said trough until a predetermined amount of feed is within said one of said receptacles, and a switch operator responsive to a raising and lowering of said receptacle for selective actuating said switch to its closed and open positions.

References Cited in the file of this patent
UNITED STATES PATENTS

| Number | Name | Date |
|---|---|---|
| 559,216 | Richards | Apr. 28, 1896 |
| 1,304,553 | Gadd | May 27, 1919 |
| 1,325,035 | Neumann | Dec. 16, 1919 |
| 1,392,311 | Egeland | Oct. 4, 1921 |
| 2,081,947 | McCornack | June 1, 1937 |
| 2,277,420 | Stanfield | Mar. 24, 1942 |
| 2,311,747 | Gooch, Jr. | Feb. 23, 1943 |
| 2,442,907 | Siler | June 8, 1948 |
| 2,515,698 | Cosby | July 18, 1950 |
| 2,526,191 | Barker | Oct. 17, 1950 |
| 2,563,321 | Dugan | Aug. 7, 1951 |